US009393861B2

(12) United States Patent
Hori et al.

(10) Patent No.: US 9,393,861 B2
(45) Date of Patent: Jul. 19, 2016

(54) VEHICLE GRILLE APPARATUS

(71) Applicant: AISIN SEIKI KABUSHIKI KAISHA, Kariya-shi (JP)

(72) Inventors: Kenji Hori, Toyota (JP); Hiroki Tanaka, Toyota (JP)

(73) Assignee: AISIN SEIKI KABUSHIKI KAISHA, Kariya-shi (JP)

( * ) Notice: Subject to any disclaimer, the term of this patent is extended or adjusted under 35 U.S.C. 154(b) by 0 days.

(21) Appl. No.: 14/699,044

(22) Filed: Apr. 29, 2015

(65) Prior Publication Data

US 2015/0321548 A1 Nov. 12, 2015

(30) Foreign Application Priority Data

May 9, 2014 (JP) ................................ 2014-097484

(51) Int. Cl.
*B60K 11/00* (2006.01)
*B60K 11/08* (2006.01)
*B60K 11/04* (2006.01)

(52) U.S. Cl.
CPC ............... *B60K 11/085* (2013.01); *B60K 11/04* (2013.01)

(58) Field of Classification Search
CPC .............................. B60K 11/085; B60K 11/04
USPC ........................................................ 180/68.1
See application file for complete search history.

(56) References Cited

U.S. PATENT DOCUMENTS 1,950,792 A * 3/1934 Green ...................... F01P 7/10 165/98
4,410,032 A * 10/1983 Mori .................... B60K 11/085 123/41.06
7,717,208 B2 * 5/2010 Knauer ..................... F01P 7/10 180/68.1
7,766,111 B2 * 8/2010 Guilfoyle ............... B60K 11/04 180/68.1
8,398,131 B2 * 3/2013 Boutaris .............. B60K 11/085 180/68.1
8,505,660 B2 * 8/2013 Fenchak .............. B60K 11/085 180/68.1
8,640,802 B2 * 2/2014 Schneider ............ B60K 11/085 180/68.1
8,960,343 B2 * 2/2015 Asano .................... B60K 11/04 180/68.1
8,967,308 B2 * 3/2015 Saito .................... B60K 11/085 180/68.1
2009/0050385 A1 * 2/2009 Guilfoyle ............... B60K 11/04 180/68.1
2010/0139583 A1 * 6/2010 Klotz .................. B60K 11/085 123/41.04
2010/0282533 A1 * 11/2010 Sugiyama ............ B60K 11/085 180/68.1
2012/0090906 A1 * 4/2012 Charnesky ........... B60K 11/085 180/68.1
2012/0186890 A1 7/2012 Hori et al.
2014/0005897 A1 * 1/2014 Hayakawa ........... B60K 11/085 701/49
2014/0194052 A1 7/2014 Asano et al.
2014/0288760 A1 * 9/2014 Asano ................. B60K 11/085 701/29.2

FOREIGN PATENT DOCUMENTS

DE 10 2004 026419 A1 12/2005
JP 58-139519 9/1983
JP 2012-148705 8/2012

* cited by examiner

*Primary Examiner* — Hau Phan

(74) *Attorney, Agent, or Firm* — Oblon, McClelland, Maier & Neustadt, L.L.P.

(57) ABSTRACT

A vehicle grille apparatus includes: a first cover member that includes a plurality of fixed fins which are disposed to be lined up in an opening portion of a front grille; a second cover member that includes a plurality of movable fins which are connected to each other in such a manner as to be able to integrally move, and configured such that the movable fins are disposed in a line to alternate with the fixed fins; and a drive mechanism that changes the degree of opening of the front grille by driving the second cover member such that the movable fins retract behind the respective fixed fins.

4 Claims, 9 Drawing Sheets

FULLY CLOSED STATE

FULLY OPEN STATE

VEHICLE GRILLE APPARATUS

CROSS REFERENCE TO RELATED APPLICATIONS

This application is based on and claims priority under 35 U.S.C. §119 to Japanese Patent Application 2014-097484, filed on May 9, 2014, the entire contents of which are incorporated herein by reference.

TECHNICAL FIELD

This disclosure relates to a vehicle grille apparatus.

BACKGROUND DISCUSSION

In the related art, there is a grille apparatus that includes a plurality of cover members (long grille plates) provided in an opening portion (grille opening portion) of a front grille, and can change the degree of opening of the front grille by turning the cover members (for example, refer to JP58-139519UM-A (Reference 1)).

That is, for example, while a vehicle is travelling at a high speed, it is possible to improve aerodynamic performance (for example, a "Cd value") by decreasing the degree of opening of the front grille, and limiting the flow rate of air flowing into an engine compartment (closed state). During engine start-up, it is possible to reduce a warm-up time of an engine by decreasing the flow rate of air to be introduced to a radiator. When the temperature of the engine tends to increase, it is possible to manage the engine temperature appropriately by increasing the degree of opening of the front grille, and increasing the flow rate of air flowing into the engine compartment (open state).

However, in the configuration of turning the cover members, a large number of moving points become a problem in improving the reliability of the apparatus. To solve the problem, for example, a grille apparatus disclosed in JP2012-148705A (Reference 2) is configured such that a single cover member is slidably provided in front of a grille opening portion, and the grille opening portion is opened and closed. Accordingly, it is possible to improve reliability by reducing the number of moving points.

However, the configurations in the related art have a problem that a certain amount of time is required to complete an opening and closing operation because a stroke of the opening and closing operation, that is, a movement distance of the cover member is large. In addition, the configurations require an accommodation space for the cover member and a large space for the disposition of a moving mechanism. Since there is a problem in that the thickness of the cover member in a vehicle longitudinal direction increases when the cover member is deployed in front of the grille opening portion, there is still room for improvement in this regard.

SUMMARY

Thus, a need exists for a vehicle grille apparatus which is not suspectable to the drawback mentioned above.

A vehicle grille apparatus according to an aspect of this disclosure preferably includes: a first cover member that includes a plurality of fixed fins which are disposed to be lined up in an opening portion of a front grille; a second cover member that includes a plurality of movable fins which are connected to each other in such a manner as to be able to integrally move, and configured such that the movable fins are disposed in a line to alternate with the fixed fins; and a drive mechanism that changes the degree of opening of the front grille by driving the second cover member such that the movable fins retract behind the respective fixed fins.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
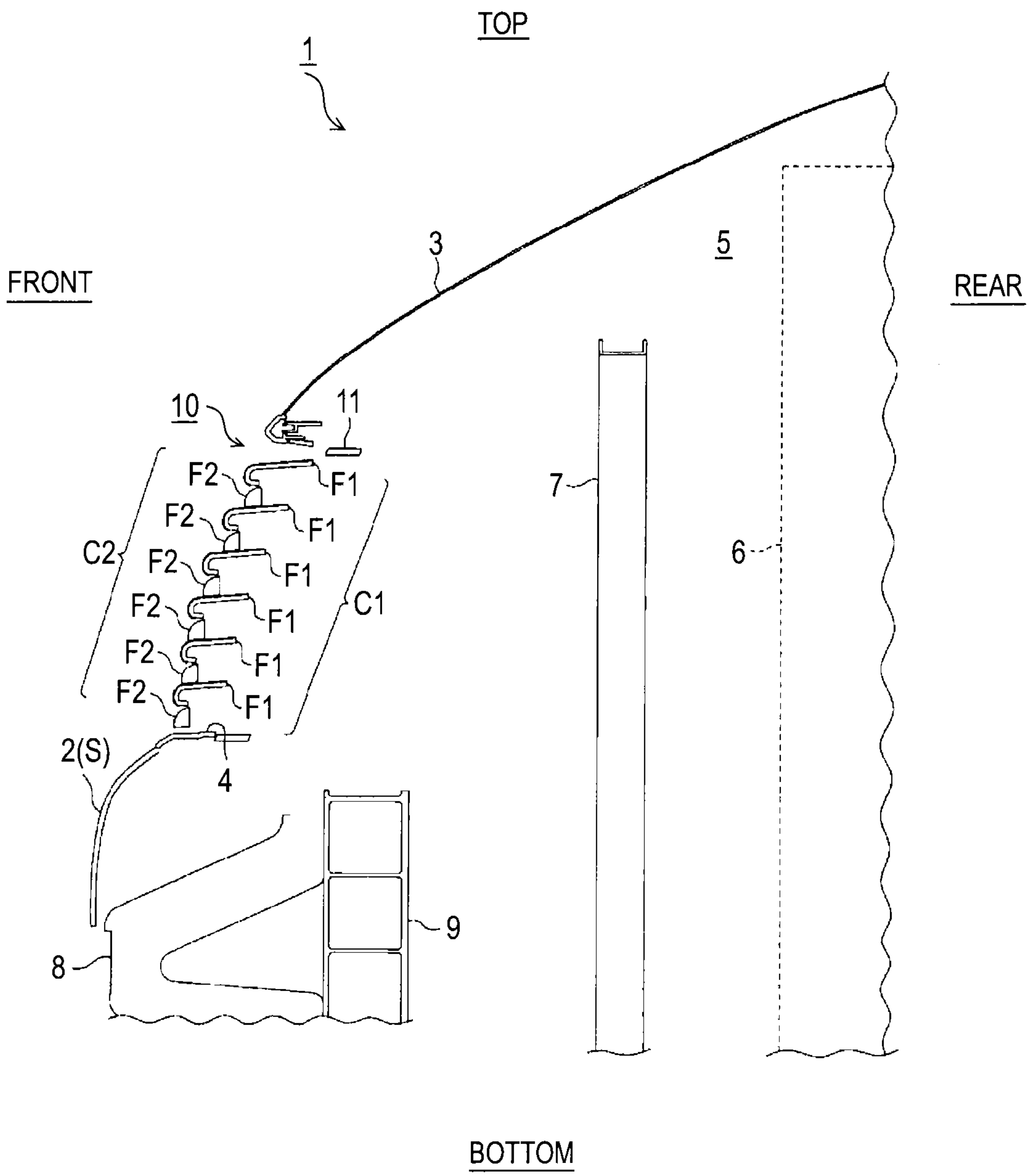
FIG. 1 is a view illustrating a schematic configuration of a vehicle in which a vehicle grille apparatus is mounted.

Hereinafter, an embodiment of a vehicle grille apparatus will be described with reference to the accompanying drawings. As illustrated in FIG. 1, an opening portion (a grille opening portion 4) is formed in a front grille 2 of a front designed surface S of a vehicle 1, and an outer space in front of the vehicle communicates with an inner space of a vehicle body 3 via the opening portion. An engine compartment 5 formed inside the vehicle body 3 accommodates a radiator 7 configured to cool an engine 6.

In the vehicle 1 of the embodiment, the grille opening portion 4 is provided in a center region in a vehicle lateral direction (in a direction perpendicular to the drawing sheet in FIG. 1), specifically, above a bumper 8 and a bumper reinforcement 9. The radiator 7 is disposed at a position hit by air flowing through the grille opening portion 4, that is, in front of the engine 6 in the engine compartment 5.

As illustrated in FIGS. 1, 2A and 2B, and 3A and 3B, cover members (C1 and C2) are provided inside the grille opening portion 4, and include a plurality of fins (F1 and F2) extending in the vehicle lateral direction. Air is taken into the engine compartment 5 while flowing through gaps between the fins (F1 and F2).

Specifically, a first cover member C1 is provided inside the grille opening portion 4, and has a plurality of fixed fins F1 which are disposed to be aligned with substantially evenly spaced gaps therebetween in a vertical direction. In addition, a second cover member C2 is provided inside the grille opening portion 4, and has a plurality of movable fins F2 which are connected to each other in such a manner as to be able to move integrally, and is configured such that the movable fins F2 are disposed in a line to alternate with the fixed fins F1 of the first cover member C1. In the embodiment, the first cover member C1 and the second cover member C2 are made of resin. In the embodiment, a vehicle grille apparatus 10 is formed such that the degree of opening of the front grille 2 is changed by changing the positions of the movable fins F2 relative to those of the fixed fins F1.

As illustrated in FIGS. 1 to 4, in the embodiment, a first frame 11 is fixed inside the grille opening portion 4, and has the appearance of a square frame extending in the vehicle lateral direction. The fixed fins F1 of the first cover member C1 are disposed inside the first frame 11 in a state where longitudinal end portions of the fixed fins F1 are supported by side wall portions 11*a* and 11*b* of the first frame 11.

The vehicle grille apparatus 10 of the embodiment includes a center frame 12 at the center of the grille opening portion 4, and the center frame 12 is configured to support an emblem plate (not illustrated) of the vehicle 1. The center frame 12 supports one longitudinal ends of the fixed fins F1 which are disposed at the same height as that of the center frame 12.

In addition, the first frame 11 and the center frame 12 are made of resin. In the embodiment, the first frame 11 and the center frame 12 are molded integrally with the first cover member C1, and thereby a manufacturing process thereof is simplified.

Figure 2A:
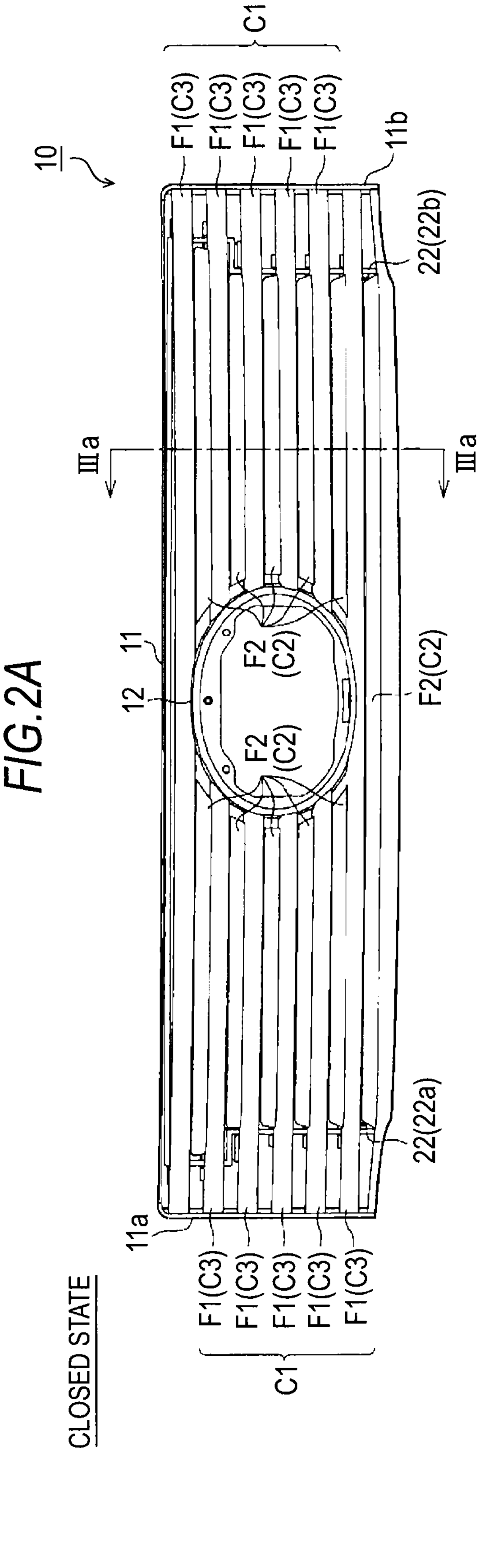
FIG. 2A is a front view of the vehicle grille apparatus (a fully closed state)
Figure 2B:
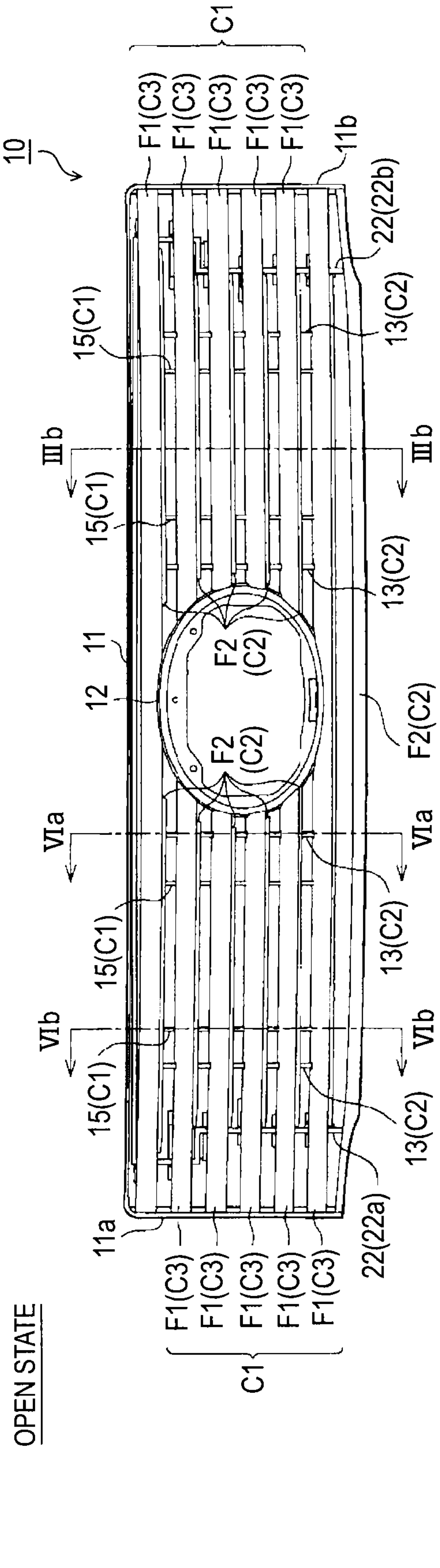
FIG. 2B is a front view of the vehicle grille apparatus (a fully open state)
Figure 5:
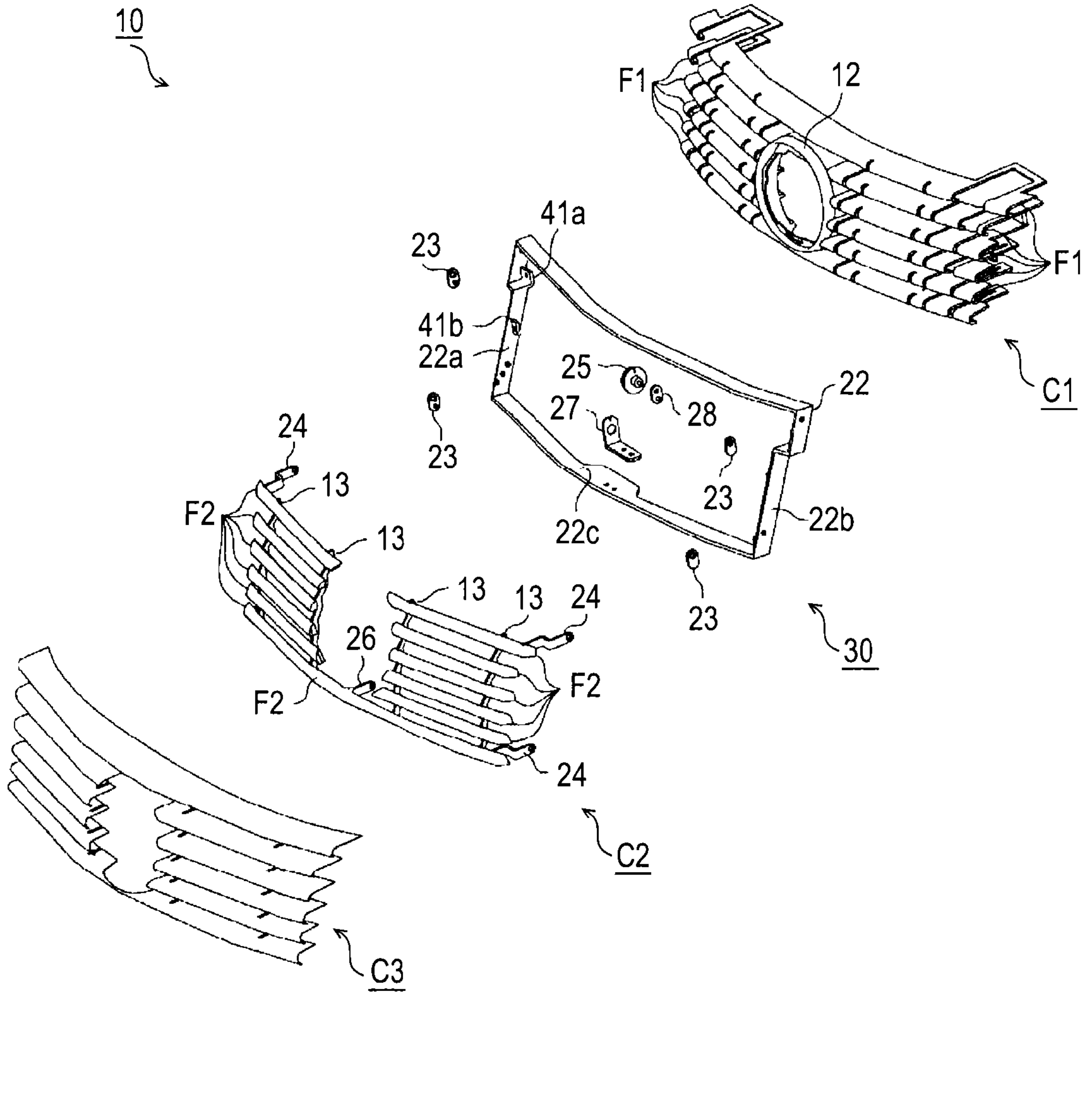
FIG. 5 is an exploded perspective view of the vehicle grille apparatus.
Figure 6B:
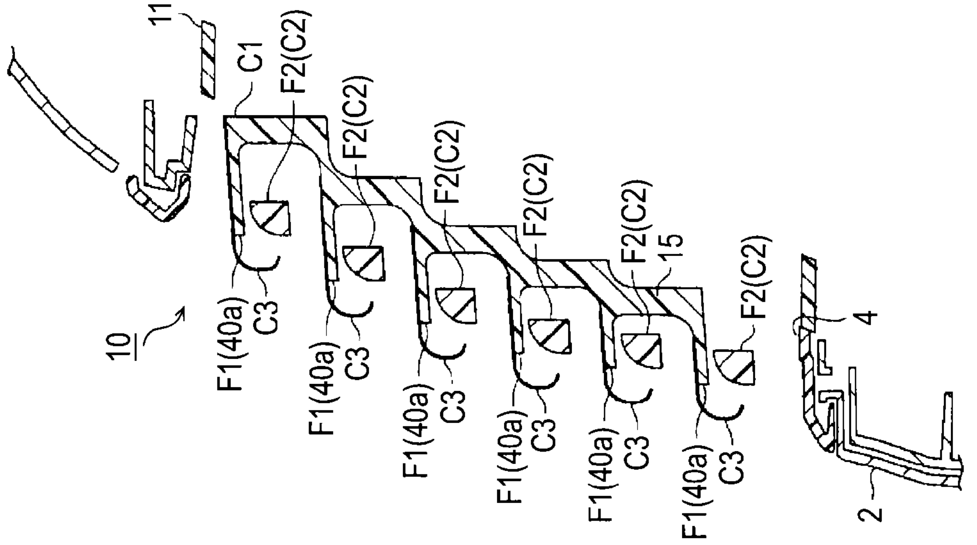
FIG. 6B is a cross-sectional view of the vehicle grille apparatus taken along line VIb-VIb in FIG. 2B.
Figure 6A:
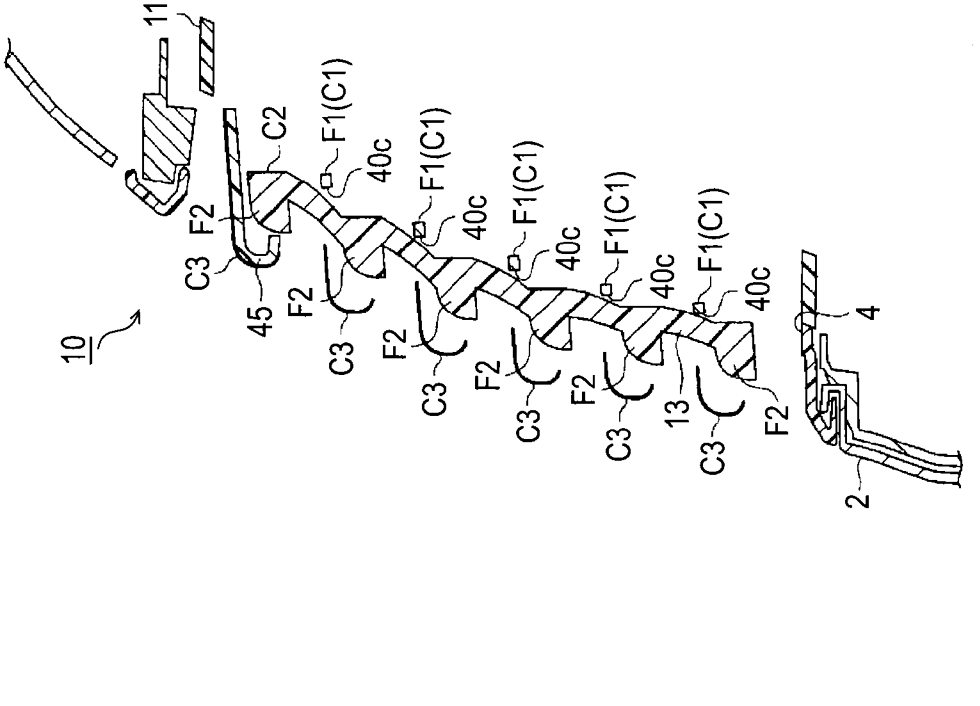
FIG. 6A is a cross-sectional view of the vehicle grille apparatus taken along line VIa-VIa in FIG. 2B.

As illustrated in FIGS. 2B, 5 and 6A, the second cover member C2 of the embodiment includes a plurality of support columns 13 which are configured to extend in the vertical direction while being disposed at separate positions in the vehicle lateral direction. The movable fins F2 are connected to each other while bridging between the support columns 13 in such a manner as to be able to move integrally.

Specifically, the second cover member C2 of the embodiment includes a total of four support columns 13, two of which each are disposed respectively on right and left sides with the center frame 12 interposed therebetween in the vehicle lateral direction. Accordingly, in the embodiment, it is possible to dispose the movable fins F2 at the respective positions in which the movable fins F2 do not interfere with the center frame 12 while being supported by the plurality of support columns 13.

As illustrated in FIGS. 2B and 6B, in the embodiment, similar to the second cover member C2, the first cover member C1 also includes support columns 15, two of which each are disposed respectively on right and left sides with the center frame 12 interposed therebetween. Since the fixed fins F1 are supported by the support columns 15 while bridging therebetween, the rigidity of the fixed fins F1 is increased.

As illustrated in FIG. 5, the vehicle grille apparatus 10 of the embodiment includes a second frame 22 configured to support the second cover member C2 via a plurality of turning links (23 and 28). In the embodiment, the second frame 22 is formed in the shape of a substantially square frame. The plurality of turning links 23 are respectively provided in opposite side wall portions 22*a* and 22*b* of the second frame 22. The second cover member C2 of the embodiment is provided with a plurality of connecting arms 24 connected respectively to the turning links 23.

Figure 7A:
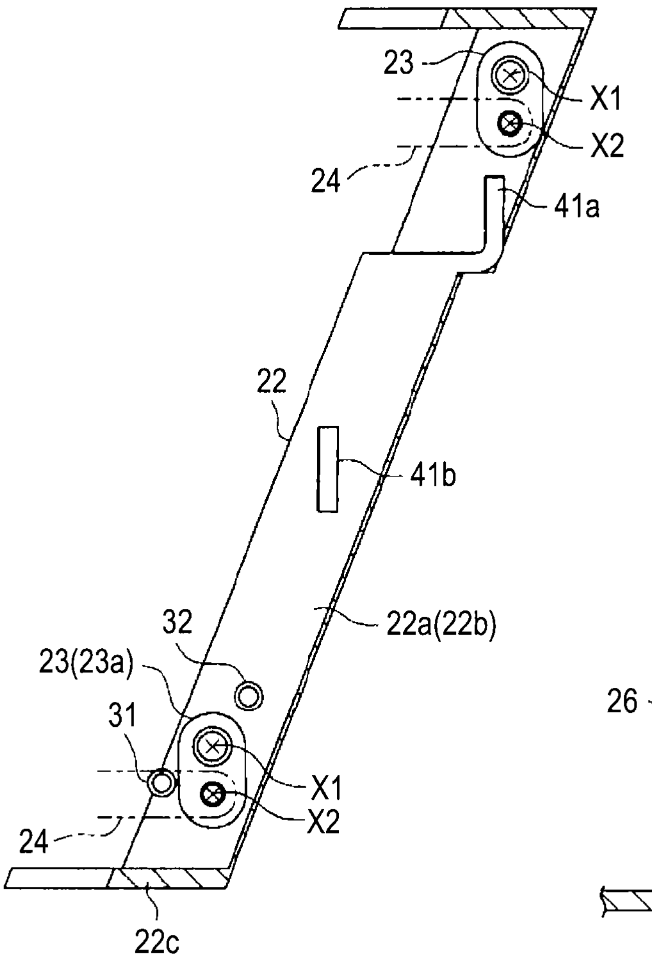
FIG. 7A is a side view of a turning link provided in a side wall portion of a second frame.

Specifically, as illustrated in FIGS. 5 and 7A, the second frame 22 of the embodiment includes four turning links 23 which are respectively provided in the vicinities of the respective upper and lower end portions of the opposite side wall portions 22*a* and 22*b*. The second cover member C2 of the embodiment is provided with four connecting arms 24 which are configured to respectively extend rearward (refer to FIGS. 3A and 3B, and in a rightward direction in FIGS. 3A and 3B) from the opposite upper and lower end portions in a lateral direction (in the vehicle lateral direction) of the second cover member C2. The second frame 22 of the embodiment is configured to swingably support the second cover member C2 via the connection of the connecting arms 24 respectively to distal end portions of the turning links 23.

Figure 7B:
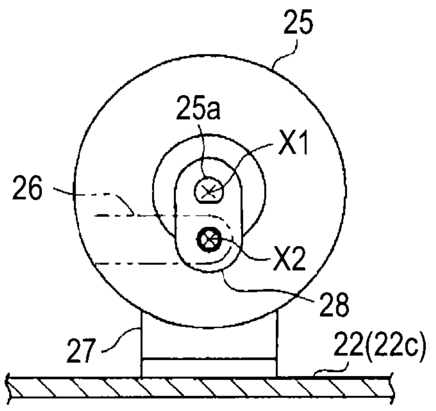
FIG. 7B is a side view of a turning link provided in an actuator.

As illustrated in FIGS. 5 and 7B, the vehicle grille apparatus 10 of the embodiment includes an actuator 25 configured to reduce the rotational speed of a motor (not illustrated) and to output the reduced rotational speed. The second cover member C2 is provided with a connecting arm 26 connected to the actuator 25.

Specifically, the actuator 25 of the embodiment is supported by a bracket 27, and is fixed to a lower wall portion 22*c* of the second frame 22, specifically, substantially the lateral center of the second frame 22. The connecting arm 26 extends rearward from a lower end portion of the second cover member C2, specifically, from substantially a lateral center of the second cover member C2. The actuator 25 is connected to the connecting arm 26 via the turning link 28. As a result, in the embodiment, a drive mechanism 30, which can move the movable fins F2 of the second cover member C2 relative to the fixed fins F1 of the first cover member C1, is formed.

Specifically, as illustrated in FIGS. 7A and 7B, the turning links 23, which are positioned on the opposite lateral sides of the second frame 22, are turnably connected respectively to the opposite side wall portions 22*a* and 22*b* of the second frame 22. The turning link 28, which is positioned in a substantially lateral center portion of the second frame 22, is connected to an output shaft 25*a* of the actuator 25 in such a manner so as not to be able to turn relative to the output shaft 25*a*. The connecting arms 24 and 26 of the second cover member C2 are connected respectively to the turning links 23 and 28 in such a manner as to be able to turn relative to the turning links 23 and 28.

As illustrated in FIG. 7A, the second frame 22 of the embodiment is provided with limiting members 31 and 32 which are configured to limit the turning of a turning link 23*a* by coming into contact with the turning link 23*a*. Specifically, a first limiting member 31 is provided in front of and below a connection point between the turning link 23*a* and the second frame 22, that is, a connection point X1 positioned at a proximal end of the turning link 23*a* (a lower left point in FIG. 7A). In contrast, a second limiting member 32 is provided at a point (an upper right point in FIG. 7A) positioned behind and above the connection point X1. Accordingly, in the embodiment, the first limiting member 31 and the second limiting member 32 limit the turning range of the turning links 23 and 28, respectively, each of which is configured to turn about the connection point X1 positioned at the proximal end thereof.

Figure 8A:
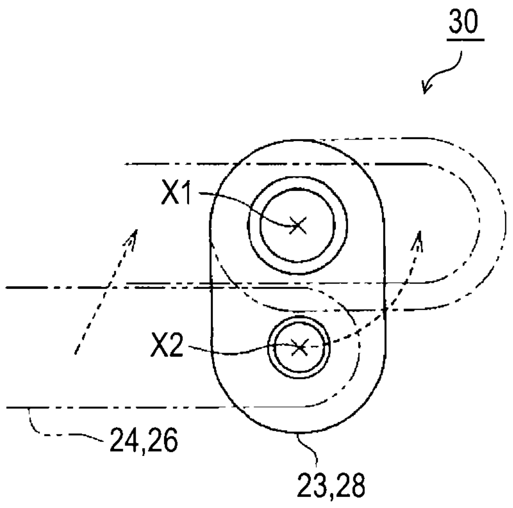
FIG. 8A is a view illustrating an operation of a moving mechanism (a fully closed state)
Figure 8B:
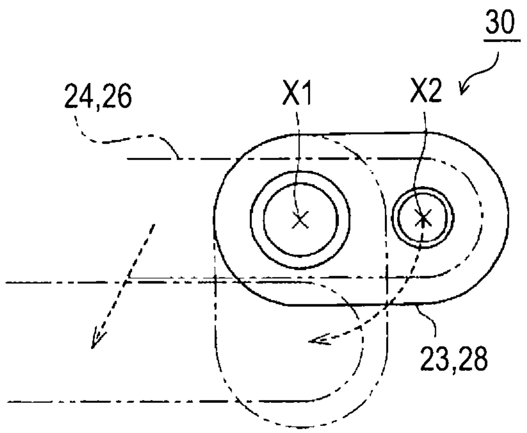
FIG. 8B is a view illustrating an operation of the moving mechanism (a fully open state)

Specifically, as illustrated in FIGS. 8A and 8B, each of the turning links 23 and 28 can turn about the connection point X1 at the proximal end thereof in a range between a position (refer to FIG. 8A) in which a distal end thereof faces downward and a position (refer to FIG. 8B) in which the distal end faces rearward. The drive mechanism 30 of the embodiment turns the turning links 23 and 28 based on a drive force from the actuator 25. Accordingly, the drive mechanism 30 is configured to drive the second cover member C2 supported by the second frame 22 to move in the vertical direction and in a longitudinal direction.

That is, as illustrated in FIG. 8A, in a case where the distal end of each of the turning links 23 and 28 faces downward, when each of the turning links 23 and 28 turns about the connection point X1 at the proximal end in a counter-clockwise direction, a connection point X2 between the turning link 23 and the connecting arm 24 and between the turning link 28 and the connecting arm 26 moves upward while moving rearward, the connection point X2 being positioned at the distal end thereof. As illustrated in FIG. 8B, in a case where the distal end of each of the turning links 23 and 28 faces rearward, when each of the turning links 23 and 28 turns about the connection point X1 at the proximal end in a clockwise direction, the connection point X2 at the distal end moves downward while moving forward. The drive mechanism 30 of the embodiment can change the positions of the movable fins F2 relative to those of the fixed fins F1 of the first cover member C1 with the use of the upward and downward movement and the frontward and backward movement of the second cover member C2 thus generated, and specifically, the drive mechanism 30 can drive retraction of the movable fins F2 behind the respective fixed fins F1.

As illustrated in FIGS. 4 to 6B, in the embodiment, each of the fixed fins F1 of the first cover member C1 is provided with a plurality of slits (40*a* to 40*c*), each of which opens to the front of the vehicle in the vehicle longitudinal direction (the left in FIGS. 6A and 6B). Specifically, the fixed fins F1 are provided with the plurality of slits 40*a* that are provided so as to mold the fixed fins F1 integrally with the support columns 15. In addition, the slits 40*b* are formed in the fixed fins F1 in such a manner that the opposite side wall portions 22*a* and 22*b* of the second frame 22 can be respectively disposed inside the slits 40*b*, the side wall portions 22*a* and 22*b* forming the drive mechanism 30. The first cover member C1 of the embodiment includes the fixed fins F1 having the plurality of slits 40*c* inside which the support columns 13 of the second cover member C2 can be respectively disposed.

Figure 9:
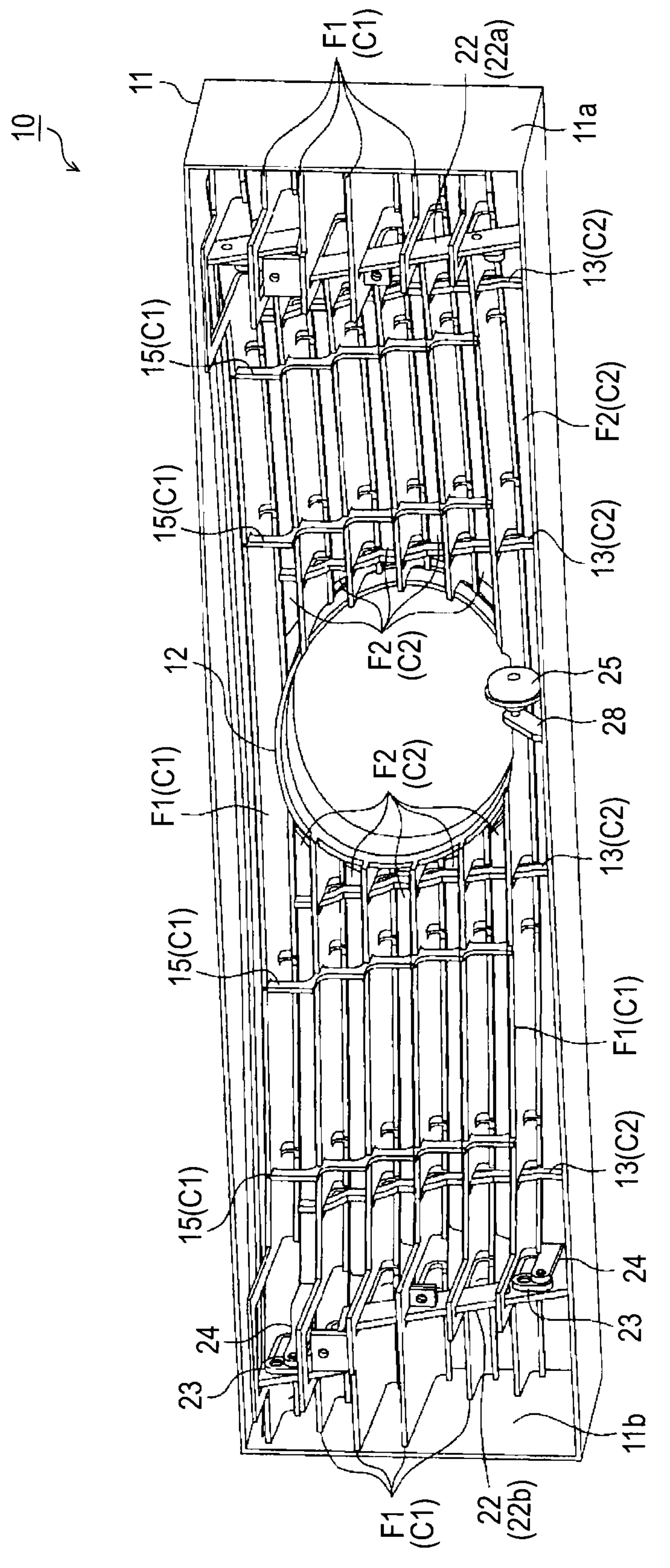
FIG. 9 is a rear perspective view of the vehicle grille apparatus.

That is, as illustrated in FIGS. 5 and 9, the second cover member C2 of the embodiment is assembled into the first frame 11 from the front of the vehicle in a state where the second cover member C2 is supported by the second frame 22. It is possible to dispose the movable fins F2 between the respective fixed fins F1 of the first cover member C1 by fixing the second frame 22 to the first cover member C1.

Figure 4:
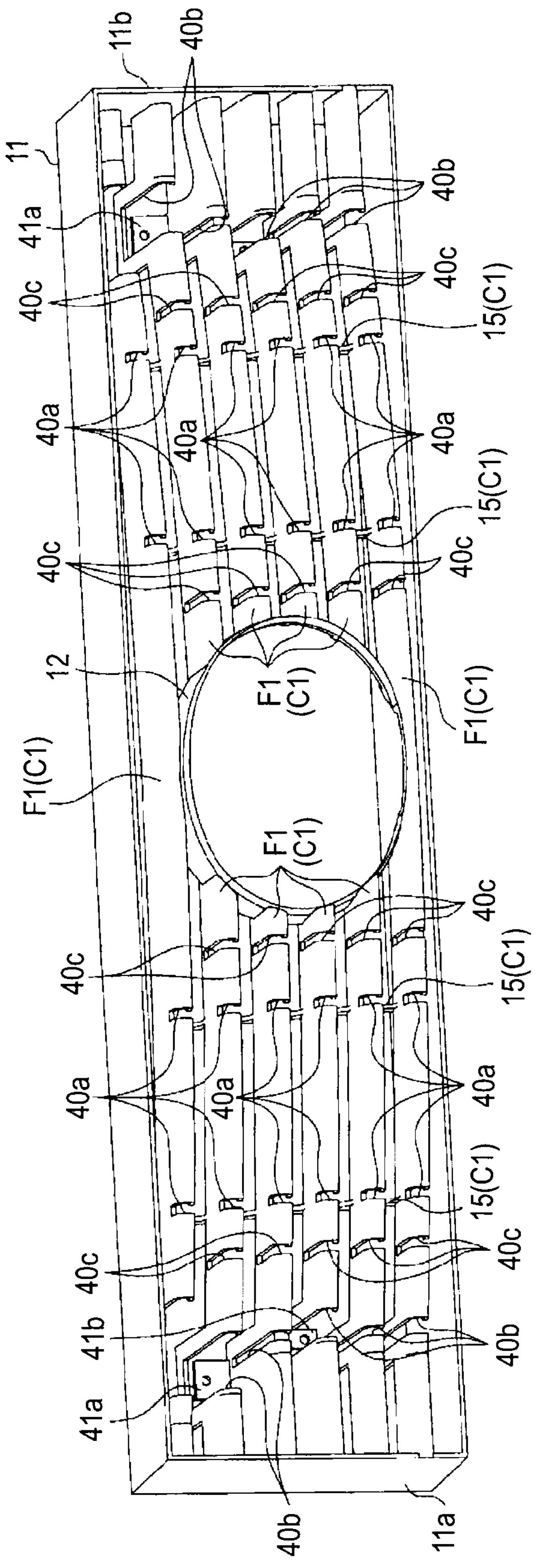
FIG. 4 is a perspective view of a first frame and a first cover member.

As illustrated in FIG. 7A, in the embodiment, tightening flanges 41*a* and 41*b* are provided in each of the opposite side wall portions 22*a* and 22*b* of the second frame 22, and are configured such that the second frame 22 is fixed to the first cover member C1 therethrough. As illustrated in FIGS. 4 and 6A, the slit 40*c*, inside which the support column 13 can be disposed, is formed in all the fixed fins F1 of the first cover member C1 except for the uppermost fixed fin F1.

Figure 3B:
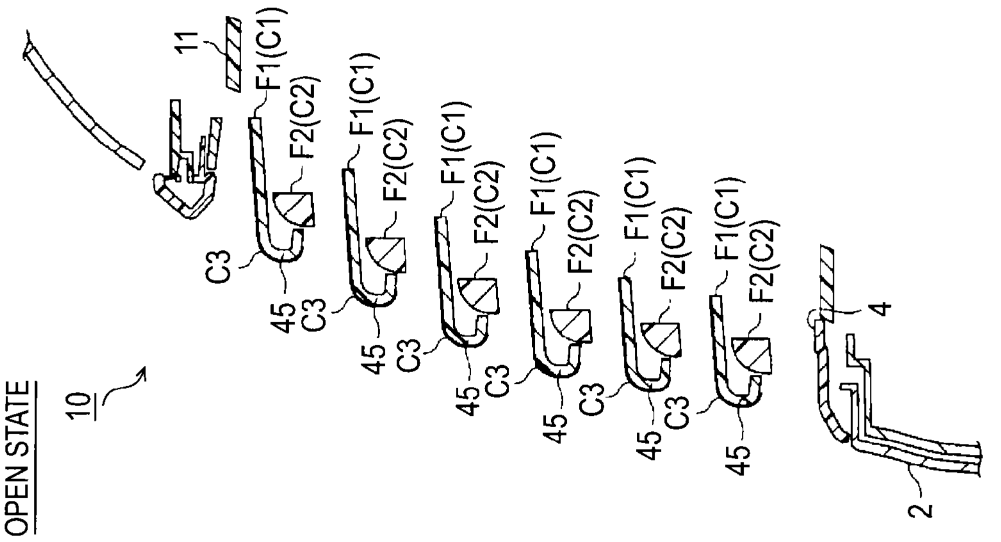
FIG. 3B is a cross-sectional view of the vehicle grille apparatus taken along line IIIb-IIIb in FIG. 2B (a fully open state)
Figure 3A:
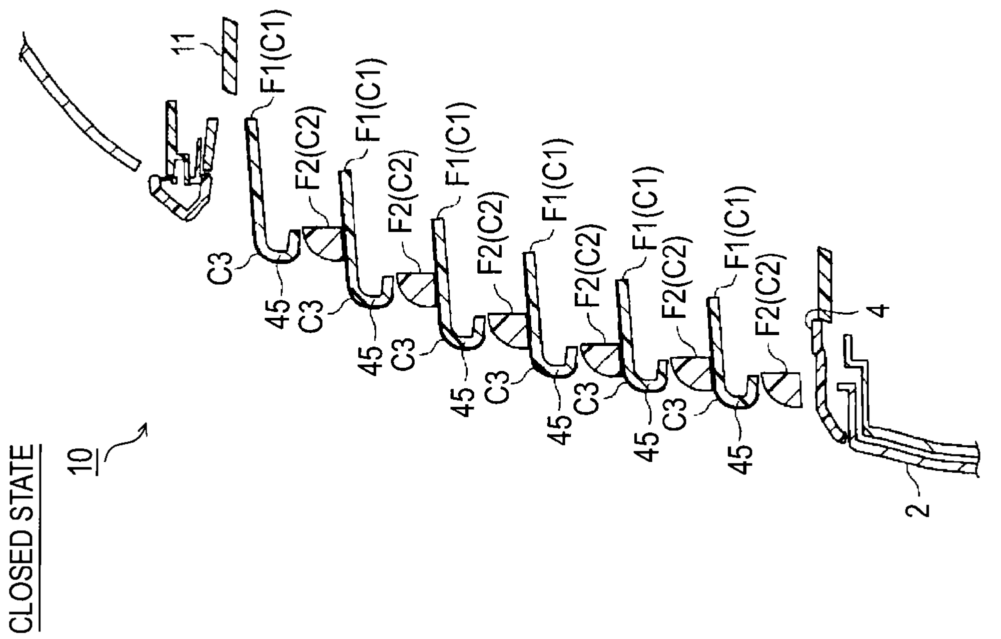
FIG. 3A is a cross-sectional view of the vehicle grille apparatus taken along line IIIa-IIIa in FIG. 2A (a fully closed state)

That is, as illustrated in FIG. 3A, the vehicle grille apparatus 10 of the embodiment is configured such that the movable fins F2 of the second cover member C2 supported by the second frame 22 are disposed in a line to alternate with the fixed fins F1 of the first cover member C1 when the distal end of each of the turning links 23 and 28 faces downward (refer to FIG. 8A).

As illustrated in FIG. 3B, the vehicle grille apparatus 10 of the embodiment is configured such that the movable fins F2 of the second cover member C2 retract behind the respective fixed fins F1 of the first cover member C1 when the distal end of each of the turning links 23 and 28 faces rearward (refer to FIG. 8B).

Accordingly, the vehicle grille apparatus 10 of the embodiment can switch between a "fully closed state" in which the degree of opening of the grille opening portion 4 becomes a minimum value and a "fully open state" in which the degree of opening of the grille opening portion 4 becomes a maximum value.

More specifically, as illustrated in FIGS. 3A and 3B, in the embodiment, a curved portion 45 is provided in a front end portion of each of the fixed fins F1 of the first cover member C1 in the vehicle longitudinal direction. Specifically, the curved portion 45 has a substantially arc-shaped cross section, and extends downward from the fixed fin F1. The drive mechanism 30 of the embodiment is configured such that the second cover member C2 is driven to move upward (and rearward) by the turning of the turning links 23 and 28 (refer to FIGS. 8A and 8B), and thus the movable fins F2 retract behind the respective curved portions 45.

The movable fin F2 of the embodiment is formed such that substantially the entirety of the movable fin F2 is hidden behind the curved portion 45 when seen from the front of the vehicle in a state where the movable fin F2 retracts behind the curved portion 45. The movable fin F2 has an appearance by which the gap between the fixed fins F1 can be substantially blocked when the movable fin F2 is deployed between the fixed fins F1.

As illustrated in FIGS. 3A and 3B and FIGS. 6A and 6B, the vehicle grille apparatus 10 of the embodiment includes a third cover member C3 that is configured to cover the front of each of the fixed fins F1 in the vehicle longitudinal direction. In the embodiment, the third cover member C3 is also made of resin. The third cover member C3 of the embodiment is attached to the fixed fins F1 while covering the design face of each of the fixed fins F1 and the curved portion 45 when seen from the front.

As such, in the embodiment, it is possible to obtain the following effects. (1) A vehicle grille apparatus 10 includes: a first cover member C1 configured to have a plurality of fixed fins F1 which are disposed to be lined up in a grille opening portion 4; and a second cover member C2 configured to have a plurality of movable fins F2 which are connected to each other in such a manner as to be able to integrally move, and configured such that the movable fins F2 are disposed in a line to alternate with the fixed fins F1. In addition, the vehicle grille apparatus 10 includes a drive mechanism 30 configured to change the degree of opening of a front grille 2 by driving the second cover member C2 such that the movable fins F2 retract behind the respective fixed fins F1.

With this configuration, it is possible to decrease a stroke of a variable opening operation (an opening and closing operation) of the movable fin F2, that is, the movement distance of the movable fin F2 by driving retraction of the movable fin F2 behind the fixed fin F1 disposed adjacent to the movable fin F2. Since the movable fins F2 are driven to integrally move while being connected to each other, it is possible to simplify the configuration of the drive mechanism 30. In addition, it is possible to ensure high reliability by reducing the number of moving points of the apparatus. It is possible to reduce the size of the apparatus by virtue of a small amount of movement and the simplified configuration.

(2) The second cover member C2 includes a plurality of support columns 13, and the movable fins F2 are connected to each other while bridging between the support columns 13. The first cover member C1 includes the fixed fins F1, each of which is provided with a plurality of slits 40*c* inside which the support columns 13 of the second cover member C2 can be respectively disposed.

That is, it is possible to integrally connect the movable fins F2 by adopting a simple configuration, a so-called jetty structure in which the movable fins F2 bridge between the plurality of support columns 13. Accordingly, it is possible to increase the rigidity of the second cover member C2. Since the support column 13 is disposed inside the slits 40*c* of the fixed fins F1, it is possible to dispose (deploy) the movable fin F2 between the fixed fins F1 while preventing the support column 13 from protruding in a vehicle longitudinal direction. Accordingly, with this configuration, it is possible to reduce the thickness (the length in the vehicle longitudinal direction) of the apparatus in a deployed state. As a result, it is possible to improve ease of mounting the apparatus.

(3) The drive mechanism 30 includes a second frame 22 that is configured to support the second cover member C2 via a plurality of turning link 23 (28). Each of the fixed fins F1 of the first cover member C1 is provided with a plurality of slits 40*b* inside which the second frame 22 (side wall portions 22*a* and 22*b* of the second frame 22) can be disposed.

With this configuration, it is possible to dispose the second frame 22 at a position in which the second frame 22 overlaps the first cover member C1 in the vehicle longitudinal direction. Accordingly, it is possible to further reduce the thickness of the apparatus in a deployed state.

(4) Each of the slits 40*a* to 40*c* in each of the fixed fins F1 has an opening portion configured to open toward the front of the vehicle in the vehicle longitudinal direction. With this configuration, it is possible to assemble the second cover member C2 (and the drive mechanism 30) from the front of the vehicle after assembling the first cover member C1 in the grille opening portion 4. As a result, it is possible to easily and efficiently perform an assembly operation.

(5) The vehicle grille apparatus 10 further includes a third cover member C3 configured to cover the front of each of the fixed fins F1 in the vehicle longitudinal direction. With this configuration, it is possible to prevent foreign objects from entering the slits 40*a* to 40*c* which are configured to open toward the front. Accordingly, it is possible to ensure a smooth operation of the movable fins F2 and to improve the reliability. In addition, it is possible to improve the design of the apparatus.

(6) A front end portion of each of the fixed fins F1 in the vehicle longitudinal direction is provided with a curved portion 45. The drive mechanism 30 drives retraction of the movable fins F2 behind the respective curved portions 45. With this configuration, it is possible to change the degree of opening of the front grille 2 with a small movement. In addition, it is possible to retract the movable fins F2 while maintaining a state in which the fixed fins F1 overlap the respective movable fins F2 in the vehicle longitudinal direction. As a result, it is possible to reduce the thickness of the apparatus when the movable fin F2 is in a retracted state.

(7) The first cover member C1 and the second cover member C2 include the fixed fin F1 and the movable fin F2, respectively, each of which extends in a vehicle lateral direction. The drive mechanism 30 drives the second cover member C2 to move upward such that the movable fins F2 can retract behind the respective curved portions 45 which are provided in the front end portions of the respective fixed fins F1.

That is, when the front grille 2 is seen from the front of the vehicle, the fixed fins F1 are positioned in such a manner to look down at the respective movable fins F2, both of which are disposed in the grille opening portion 4. Accordingly, with this configuration, it is possible to hide the retracted movable fins F2 below the fixed fins F1. It is possible to improve the design of the apparatus by concealing the movable fins F2 when the movable fins F2 are retracted.

The embodiment may be changed as follows.

In the embodiment, air is taken into the engine compartment 5 formed inside the vehicle body 3 when flowing through the grille opening portion 4. However, air may not be necessarily taken into the engine compartment 5. That is, for example, air may be taken into a space into which the air is introduced through the grille opening portion 4, for example, an accommodating chamber configured to accommodate a heat exchanger such as the radiator 7, in a vehicle in which an engine is not mounted in a vehicle inner space in front of a passenger compartment, for example, a vehicle with an engine disposed at the rear or the center of the vehicle, or an electric vehicle.

The embodiment is realized in the vehicle grille apparatus 10 formed in the grille opening portion 4 provided above the bumper 8. However, this disclosure is not limited to the configuration in the embodiment, and may be applied to a vehicle grille apparatus formed in a grille opening provided below the bumper 8.

In the embodiment, the curved portion 45, which is configured to have a substantially arc-shaped cross section and to extend downward, is formed in the front end portion of each of the fixed fins F1. In addition, the movable fin F2 is formed such that substantially the entirety of the movable fin F2 is hidden behind the curved portion 45 when seen from the front of the vehicle, in a state where the movable fin F2 retracts behind the curved portion 45. The movable fin F2 has an appearance by which the gap between the fixed fins F1 can be substantially blocked when the movable fin F2 is deployed between the fixed fins F1. However, this disclosure is not limited to the configuration in the embodiment, and the shape of each of the fixed fin F1 and the movable fin F2 may be arbitrarily changed. For example, the fixed fin F1 may be configured to have the curved portion 45 configured to extend upward. In addition, the fixed fin F1 may be configured not to have the curved portion 45. The fixed fin F1 and the movable fin F2 may be configured to have substantially the same shape. The materials, the forming methods, or the like of the fixed fin F1 and the movable fin F2 may be arbitrarily changed.

When the vehicle grille apparatus 10 is in a "fully closed state" in which the degree of opening of the grille opening portion 4 becomes a minimum value, the movable fin F2 may not necessarily substantially block the gap between the fixed fins F1.

In the embodiment, the second cover member C2 includes the plurality of support columns 13 which are configured to extend in the vertical direction while being disposed at the separate positions in the vehicle lateral direction, and the movable fins F2 are connected to each other while bridging between the support columns 13 in such a manner as to be able to move integrally. However, this disclosure is not limited to the configuration in the embodiment, and for example, all the movable fins F2 are not necessarily connected to a single support column 13. The connection structure of the movable fins F2 may be arbitrarily changed, for example, the movable fins F2 and the support columns 13 may form a meshed shape.

In the embodiment, the first cover member C1 and the second cover member C2 include the respective fixed fins F1 and movable fins F2, both of which are configured to extend in the vehicle lateral direction. The fixed fins F1 and the movable fins F2 are respectively disposed to be lined up in the vertical direction. However, this disclosure is not limited to the configuration in the embodiment, and the first cover member C1 and the second cover member C2 may include the respective fixed fins F1 and movable fins F2, both of which extend in the vertical direction. In this case, the fixed fins F1 and the movable fins F2 may be respectively disposed to be lined up in the vehicle lateral direction.

In the embodiment, each of the fixed fins F1 is provided with the plurality of slits 40*a* to 40*c* configured to open toward the front of the vehicle. However, this disclosure is not limited to the configuration in the embodiment, and the shape of the slit and the number of slits in each of the fixed fins F1 may be arbitrarily changed. For example, the slits 40*a* configured to mold the fixed fins F1 integrally with the support columns 15 may not be necessarily provided, or the slits 40*b* configured to dispose the opposite side wall portions 22*a* and 22*b* of the second frame 22 thereinside may not be necessarily provided. In addition, the slits 40*c* configured to dispose the support columns 13 of the second cover member C2 thereinside may not be necessarily configured. Each of the slits may be configured to open toward the back. This disclosure may adopt a configuration in which the slits are not formed.

In the embodiment, the vehicle grille apparatus 10 includes the third cover member C3 configured to cover the front of each of the fixed fins F1; however, the vehicle grille apparatus 10 may be configured not to have the third cover member C3.

In the embodiment, the drive mechanism 30 is made up of the second frame 22 and the actuator 25 which are support members, and the turning links 23 and 28 provided respectively in the second frame 22 and the actuator 25. However, this disclosure is not limited to the configuration in the embodiment, and the configuration and disposition of the drive mechanism 30 may be arbitrarily changed. For example, this disclosure may adopt a configuration in which retraction of the movable fins F2 behind the respective fixed fins F1 by the downward movement of the second cover member C2 is driven.

The following description relates to technological philosophy and the effects which can be understood from the embodiment.

(1) There is provided a vehicle grille apparatus in which the drive mechanism includes a support member configured to support the second cover member, and the first cover member includes the fixed fins, each of which is provided with a plurality of slits inside which the support member can be disposed.

With this configuration, it is possible to dispose the support member at a position in which the support member overlaps the first cover member in the vehicle longitudinal direction. Accordingly, it is possible to further reduce the thickness of the apparatus in a deployed state.

A vehicle grille apparatus according to an aspect of this disclosure preferably includes: a first cover member that includes a plurality of fixed fins which are disposed to be lined up in an opening portion of a front grille; a second cover member that includes a plurality of movable fins which are connected to each other in such a manner as to be able to integrally move, and configured such that the movable fins are disposed in a line to alternate with the fixed fins; and a drive mechanism that changes the degree of opening of the front grille by driving the second cover member such that the movable fins retract behind the respective fixed fins.

With this configuration, it is possible to decrease a stroke of a variable opening operation (an opening and closing operation) of the movable fin, that is, the movement distance of the movable fin by driving retraction of the movable fin behind the fixed fin disposed adjacent to the movable fin. Since the movable fins are driven to integrally move while being connected to each other, it is possible to simplify the configuration of the drive mechanism. In addition, it is possible to ensure high reliability by reducing the number of moving points of the apparatus. It is possible to reduce the size of the apparatus by virtue of there being a small amount of movement and the simplified configuration.

In the vehicle grille apparatus according to the aspect of this disclosure, it is preferable that the second cover member includes a plurality of support columns between which the movable fins bridge, and the first cover member includes the fixed fins, each of which is provided with a plurality of slits inside which the support columns are respectively disposed.

That is, it is possible to integrally connect the movable fins by adopting a simple configuration, a so-called jetty structure in which the movable fins bridge between the plurality of support columns. Accordingly, it is possible to increase the rigidity of the second cover member. Since the support column is disposed inside the slits of the fixed fins, it is possible to dispose (deploy) the movable fin between the fixed fins while preventing the support column from protruding in a vehicle longitudinal direction. Accordingly, with this configuration, it is possible to reduce the thickness (the length in the vehicle longitudinal direction) of the apparatus in a deployed state. As a result, it is possible to improve ease of mounting the apparatus.

In the vehicle grille apparatus according to the aspect of this disclosure, it is preferable that the drive mechanism includes a support member which supports the second cover member, and the first cover member includes the fixed fins, each of which is provided with a plurality of slits inside which the support member are disposed.

In the vehicle grille apparatus according to the aspect of this disclosure, it is preferable that each of the slits opens toward the front of the fixed fin in the vehicle longitudinal direction.

With this configuration, it is possible to assemble the second cover member from the front of a vehicle after assembling the first cover member in the opening portion of the front grille (grille opening portion). As a result, it is possible to easily and efficiently perform an assembly operation.

It is preferable that the vehicle grille apparatus according to the aspect of this disclosure further includes a third cover member that covers the front of each of the fixed fins in the vehicle longitudinal direction.

With this configuration, it is possible to prevent foreign objects from entering the slits which are configured to open toward the front. Accordingly, it is possible to ensure a smooth operation of the movable fins and to improve the reliability. In addition, it is possible to improve the design of the apparatus.

In the vehicle grille apparatus according to the aspect of this disclosure, it is preferable that a front end portion of each of the fixed fins in the vehicle longitudinal direction is provided with a curved portion, and the drive mechanism drives retraction of the movable fins behind the respective curved portions.

With this configuration, it is possible to change the degree of opening of the front grille with a small movement. In addition, it is possible to retract the movable fins while maintaining a state in which the fixed fins overlap the respective movable fins in the vehicle longitudinal direction. As a result, it is possible to reduce the thickness of the apparatus when the movable fin is in a retracted state.

In the vehicle grille apparatus according to the aspect of this disclosure, it is preferable that each of the fixed fin and the movable fin extends in a vehicle lateral direction, and, the drive mechanism drives the second cover member to move upward such that the movable fins can retract behind the respective curved portions.

That is, when the front grille is seen from the front of the vehicle, the fixed fins are positioned in such a manner as to be visible above the respective movable fins, both of which are disposed in the grille opening portion. Accordingly, with this configuration, it is possible to hide the retracted movable fins below the respective fixed fins. It is possible to improve the design of the apparatus by concealing the movable fins when the movable fins are retracted.

According to the aspect of this disclosure, it is possible to change the degree of opening of the front grille with a simple configuration and a small movement.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A vehicle grille apparatus comprising:

a first cover member that includes a plurality of fixed fins which are disposed to be lined up in an opening portion of a front grille;

a second cover member that includes a plurality of movable fins which are connected to each other in such a manner as to be able to integrally move, and configured such that the movable fins are disposed in a line to alternate with the fixed fins;

a third cover member that covers a front of each of the fixed fins in a vehicle longitudinal direction; and a drive mechanism that changes the degree of opening of the front grille by driving the second cover member such that the movable fins retract behind the respective fixed fins, wherein the second cover member includes a plurality of support columns and the movable fins bridge between the support columns, wherein the first cover member includes the fixed fins and each of the fixed fins is provided with a plurality of slits, the support columns being respectively disposed inside the slits, and wherein each of the slits opens toward the front of the fixed fin in the vehicle longitudinal direction.

2. The vehicle grille apparatus according to claim 1, wherein the drive mechanism includes a support member which supports the second cover member.

3. The vehicle grille apparatus according to claim 1, wherein a front end portion of each of the fixed fins in the vehicle longitudinal direction is provided with a curved portion, and wherein the drive mechanism drives retraction of the movable fins behind the respective curved portions.

4. The vehicle grille apparatus according to claim 3, wherein each of the fixed fins and the movable fins extends in a vehicle lateral direction, and wherein the drive mechanism drives the second cover member to move upward such that the movable fins retract behind the respective curved portions.

* * * * *